(12) United States Patent
Athias et al.

(10) Patent No.: US 9,553,983 B2
(45) Date of Patent: Jan. 24, 2017

(54) DATA AND CALL ROUTING AND FORWARDING

(75) Inventors: Franklyn Athias, Cherry Hill, NJ (US); Samuel H. Schwartz, Penn Valley, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 1166 days.

(21) Appl. No.: 12/897,994

(22) Filed: Oct. 5, 2010

(65) Prior Publication Data
US 2012/0084461 A1   Apr. 5, 2012

(51) Int. Cl.
G06F 15/16 (2006.01)
H04M 3/42 (2006.01)
H04M 3/46 (2006.01)

(52) U.S. Cl.
CPC ........... H04M 3/42263 (2013.01); H04M 3/46 (2013.01); *H04M 2203/2016* (2013.01)

(58) Field of Classification Search
CPC ............... H04M 3/46; H04M 3/42263; H04M 2203/2016
See application file for complete search history.

(56) References Cited

U.S. PATENT DOCUMENTS

| | | | | |
|---|---|---|---|---|
| 5,475,748 A | * | 12/1995 | Jones | H04M 3/46 379/207.09 |
| 5,600,704 A | * | 2/1997 | Ahlberg et al. | 455/445 |
| 5,603,054 A | * | 2/1997 | Theimer et al. | 710/6 |
| 5,812,865 A | * | 9/1998 | Theimer et al. | 709/228 |
| 5,897,635 A | * | 4/1999 | Torres et al. | |
| 6,189,008 B1 | * | 2/2001 | Easty et al. | |
| 6,310,889 B1 | * | 10/2001 | Parsons et al. | 370/466 |
| 6,320,534 B1 | * | 11/2001 | Goss | 342/357.29 |
| 6,351,771 B1 | * | 2/2002 | Craddock et al. | 709/227 |

(Continued)

FOREIGN PATENT DOCUMENTS

DE     10057847     5/2002

OTHER PUBLICATIONS

Google Voice; Oct. 12, 2009; Wikipedia; 6 Pages.*

(Continued)

*Primary Examiner* — Krista Zele
*Assistant Examiner* — Anthony Fabbri
(74) *Attorney, Agent, or Firm* — Banner & Witcoff, Ltd.

(57) ABSTRACT

A system and method for determining an order in which to communicate with a list of numbers and/or addresses for a particular contact is disclosed. Each caller that communicates with the contact may specify a different order for the contact's various phone numbers and other addresses. A communication management system may then automatically dial the numbers or use messaging addresses to initiate data communications in the specified order when the initiating party attempts to communicate with the contact. The order may specify simultaneous and/or sequential use of numbers or addresses. Alternatively or additionally, the communication management system may dynamically and/or automatically determine the communication order or a portion thereof. The automatic determination of the order may be based on a communication history or communication receiving of the initiating party. In some arrangements, the order may be partially manually defined and partially automatically defined.

20 Claims, 10 Drawing Sheets

(56) References Cited

U.S. PATENT DOCUMENTS

| | | | |
|---|---|---|---|
| 6,363,421 B2* | 3/2002 | Barker et al. | 709/223 |
| 6,587,458 B1* | 7/2003 | Burg | H04L 29/06 370/352 |
| 6,678,366 B1* | 1/2004 | Burger et al. | 379/211.03 |
| 6,732,170 B2* | 5/2004 | Miyake et al. | 709/223 |
| 6,792,605 B1* | 9/2004 | Roberts et al. | 719/313 |
| 6,798,755 B2* | 9/2004 | Lillie et al. | 370/312 |
| 6,886,032 B2* | 4/2005 | Watkins | G06F 11/2097 709/216 |
| 6,950,501 B1* | 9/2005 | Chaturvedi et al. | 379/52 |
| 7,092,498 B2* | 8/2006 | Hariri et al. | 379/93.01 |
| 7,136,919 B1* | 11/2006 | Foncarnier | 709/224 |
| 7,197,565 B2* | 3/2007 | Abdelaziz et al. | 709/226 |
| 7,330,895 B1* | 2/2008 | Horvitz | 709/227 |
| 7,433,680 B2* | 10/2008 | Jenkins et al. | 455/412.1 |
| 7,447,165 B1* | 11/2008 | Sylvain | 370/254 |
| 7,502,606 B2* | 3/2009 | Flynt et al. | 455/403 |
| 7,533,343 B2* | 5/2009 | Ratnakar | G06Q 30/02 715/733 |
| 7,613,472 B2* | 11/2009 | Northcutt | 455/466 |
| 7,613,695 B1* | 11/2009 | Solomon et al. | |
| 7,801,294 B2* | 9/2010 | Levy et al. | 379/211.03 |
| 8,155,624 B2* | 4/2012 | Khoury | 455/412.1 |
| 2001/0034735 A1* | 10/2001 | Sugiyama | 707/104.1 |
| 2002/0075305 A1* | 6/2002 | Beaton | G06Q 10/107 715/751 |
| 2002/0099830 A1* | 7/2002 | Viechter | 709/227 |
| 2002/0126817 A1* | 9/2002 | Hariri et al. | 379/201.01 |
| 2002/0146005 A1* | 10/2002 | Gallant et al. | 370/389 |
| 2003/0002645 A1* | 1/2003 | Worsham | H04M 3/42229 379/211.03 |
| 2003/0046355 A1* | 3/2003 | Rosenberg et al. | 709/206 |
| 2003/0118175 A1* | 6/2003 | Hariri | H04M 1/275 379/355.02 |
| 2003/0187658 A1* | 10/2003 | Selin et al. | 704/270.1 |
| 2004/0203622 A1* | 10/2004 | Esque | H04M 3/42 455/412.1 |
| 2004/0204119 A1* | 10/2004 | Ho | H04M 1/274575 455/564 |
| 2004/0266397 A1* | 12/2004 | Smith et al. | 455/412.1 |
| 2005/0044188 A1* | 2/2005 | Nakazawa et al. | 709/219 |
| 2005/0226225 A1* | 10/2005 | Shigeta | 370/352 |
| 2005/0246355 A1* | 11/2005 | Ito | 707/100 |
| 2005/0259796 A1* | 11/2005 | Wallenius et al. | 379/93.01 |
| 2005/0261011 A1* | 11/2005 | Scott | 455/466 |
| 2005/0273493 A1* | 12/2005 | Buford et al. | 709/204 |
| 2006/0104430 A1* | 5/2006 | Kirkland | H04M 3/46 379/211.04 |
| 2006/0153166 A1* | 7/2006 | Kobayashi et al. | 370/352 |
| 2006/0209690 A1* | 9/2006 | Brooke | 370/230 |
| 2007/0087766 A1* | 4/2007 | Hardy et al. | 455/466 |
| 2007/0104182 A1* | 5/2007 | Gorti | H04L 67/306 370/352 |
| 2007/0110043 A1* | 5/2007 | Girard | 370/352 |
| 2007/0165833 A1* | 7/2007 | Wolter et al. | 379/355.02 |
| 2007/0189264 A1* | 8/2007 | Liu | H04M 3/46 370/351 |
| 2007/0192299 A1* | 8/2007 | Zuckerberg et al. | 707/3 |
| 2007/0226632 A1* | 9/2007 | Erola et al. | 715/739 |
| 2007/0233736 A1* | 10/2007 | Xiong et al. | 707/104.1 |
| 2007/0288600 A1* | 12/2007 | Arabi et al. | 709/219 |
| 2008/0013696 A1* | 1/2008 | Motley | H04M 3/42263 379/45 |
| 2008/0019267 A1* | 1/2008 | Ku et al. | 370/229 |
| 2008/0144797 A1* | 6/2008 | Spear | H04L 65/1073 379/211.01 |
| 2008/0147639 A1* | 6/2008 | Hartman et al. | 707/5 |
| 2008/0222127 A1* | 9/2008 | Bergin | 707/5 |
| 2009/0036163 A1* | 2/2009 | Kimbrell | 455/558 |
| 2009/0100378 A1* | 4/2009 | Klassen et al. | 715/821 |
| 2009/0124240 A1* | 5/2009 | Hauglum | 455/414.1 |
| 2009/0141704 A1* | 6/2009 | Eng et al. | 370/352 |
| 2009/0323558 A1* | 12/2009 | Meenavalli | 370/259 |
| 2010/0241664 A1* | 9/2010 | LeVasseur et al. | 707/779 |
| 2013/0086177 A1* | 4/2013 | Becker et al. | 709/206 |

OTHER PUBLICATIONS

Partial European Search Report EP11183821.5, dated Jan. 18, 2012.
Extended European Search Report, EP 11183821, dated May 14, 2012.
European Office Action, EP App. 11183821.5, Dated Jan. 16, 2015.
Response to EP Office Action—EP Appl. 11183821.5—submitted Jul. 9, 2015.

* cited by examiner

DATA AND CALL ROUTING AND FORWARDING

BACKGROUND

Current telephony systems allow a user to define an order in which a call is routed when the user cannot be reached at one or more numbers. Accordingly, a caller may be unable to control how his or her call is routed to the user although there may be a preferred or more efficient calling order. Furthermore, defining the call order, e.g., when done by the user, is generally a manual process that may require significant investments of time, especially if the user must define a call order for each and every contact in his or her address book.

BRIEF SUMMARY

The following presents a simplified summary of the disclosure in order to provide a basic understanding of some aspects. It is not intended to identify key or critical elements of the disclosure or to delineate the scope of the disclosure. The following summary merely presents some concepts of the disclosure in a simplified form as a prelude to the more detailed description provided below.

According to aspects described herein, a caller may define a call order for multiple phone numbers and/or addresses (e.g., voice chat address, instant messaging address, SMS or MMS addresses, e-mail addresses, etc.) associated with a particular contact. Accordingly, instead of having the contact defining the order in which addresses and numbers are used to initiate communication, the party initiating the communication (e.g., a caller) may be provided with such control. In one arrangement, a first caller may define a first call order for a contact while a second caller may define a second call order (different form the first call order) for the same contact. The call order may also provide sequential and simultaneous dialing. The caller may then be connected to the contact at the first answered call. The call order may be stored and retrieved based on an association between the order and the caller and the contact. For example, the call order may be stored in a look-up table using a caller telephone number and a contact name or telephone number as search keys. The order may include initiating communications using e-mail addresses, SMS or MMS addresses or numbers, instant messaging addresses or handles and the like.

According to another aspect, a communication order for a contact-initiator pair may be automatically and/or dynamically determined by a communication management system. The communication order may be defined based on an initiating party's communication history (e.g., a call history) and, for example, an order in which the initiating party has historically used the contact's numbers and addresses. In one arrangement, a portion of the initiating party's communication history may be selected for determining the communication order. The portion may be selected based on various factors including a recency of the portion, whether the portion of the history occurs in a similar time of day as a communication currently being made to the contact, a number of addresses or numbers of the contact matched in the portion and/or combinations thereof. Alternatively or additionally, a communication order may be defined based on a likelihood a number or address will be answered.

According to another aspect, a portion of a communication order may be initiating party-defined (e.g., caller-defined) while another portion of the order may be automatically or dynamically determined by a communication management system.

The details of these and other embodiments of the present disclosure are set forth in the accompanying drawings and the description below. Other features and advantages of the disclosure will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
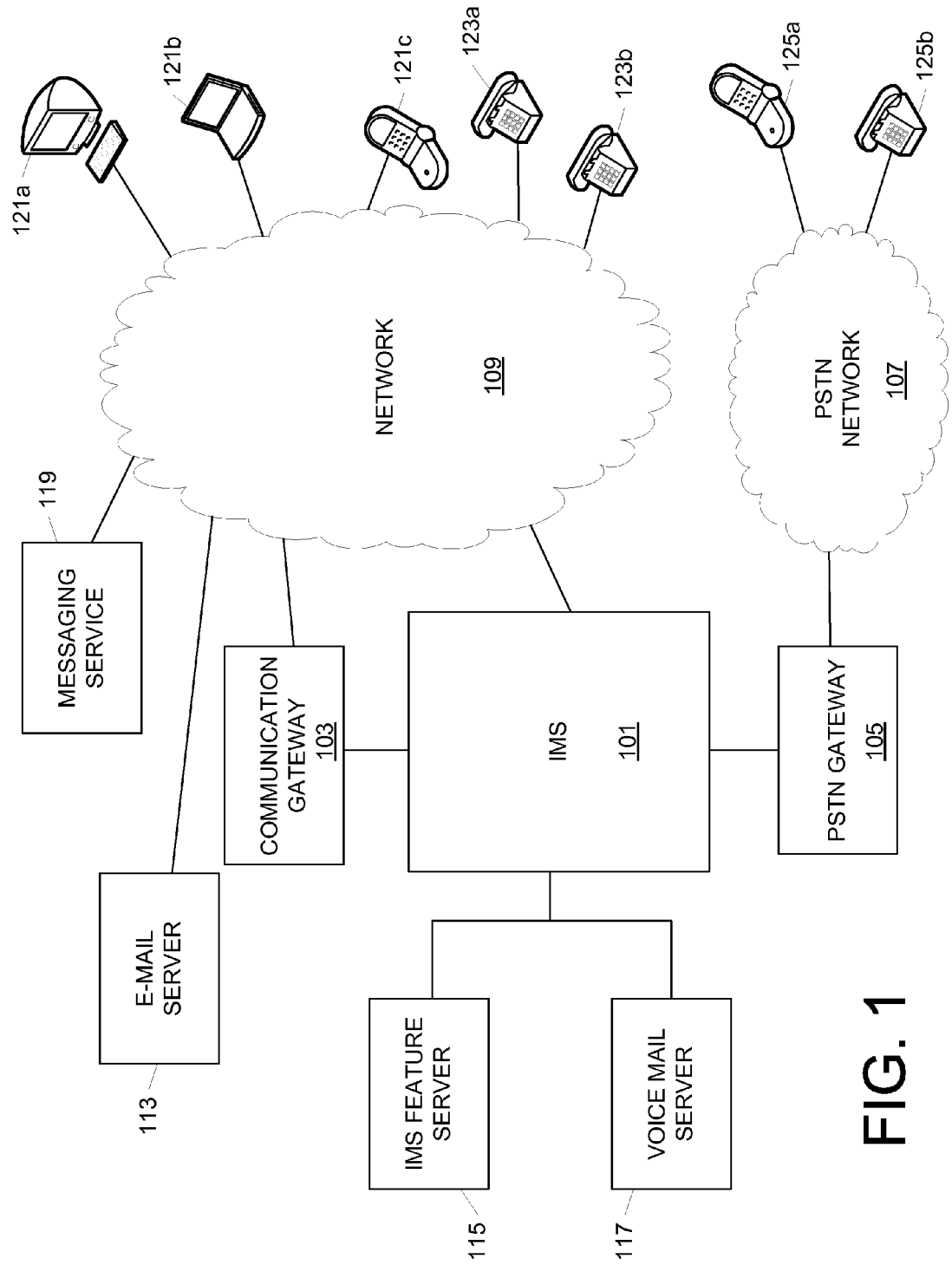
FIG. 1 illustrates an example telephone network through which calls may be routed according to one or more aspects described herein.

FIG. 1 illustrates an example communication network that allows a user to configure how calls should be directed (e.g., to voice chat, to a telephone, etc.) and managed. The communication network may include multiple portions including, for example, a public switched telephone network (PSTN) 107, and digital networks 109, such as coaxial cable networks, optical fiber networks, hybrid fiber/coax networks (HFC), cellular telephone wireless networks, local wireless networks (e.g., WiMAX), satellite networks, etc. Networks 107 and 109 may both be dedicated telephone or voice communication networks, or networks also carrying other data and content, such as video signals. In one or more arrangements, network 109 may support a digital voice network by digitizing voice communication and transmitting data over lines of the network 109. A digital voice network may be supported by a coaxial cable network, a fiber optic cable network, a satellite network, a wireless network, or any other desired physical network architecture. In one or more configurations, a digital voice network might only be accessible by subscribers to a service provider; however, the network may be accessible by non-subscribing users.

Network 109 may further support access to a packet switched-data network including, for example, a wide area network (WAN) such as the Internet. Networks 107 and 109 may interoperate through interconnected systems including Internet Protocol (IP) Multimedia Subsystem (IMS) 101 configured to manage the operations of and services offered by a service provider over a digital voice network supported by network 109. PSTN gateway 105 may be configured to process communications to and from a public switched telephone network such as telephone network 107, while a communication gateway 103 may be configured to process and manage communications over a publicly accessible data network (e.g., the Internet).

IMS 101 provides various services and features to a network of users through a digital voice network. Services may include voice communications, voicemail, call forwarding, call waiting, caller identification (ID) and the like. In one example, voice mail server 117 provides a database in which voice mail messages may be stored. Accordingly, IMS 101 or another server or system may direct voice mail messages to voice mail server 117 if a called party is not currently available (e.g., line is busy, no answer, etc.). IMS 101 may further interact with IMS feature server 115 to control connection services, select processes/services that may be applied to a call, provide routing within a network such as digital voice network 109, and the like. In one or more arrangements, voice communication devices or accounts may be identified by a voice communication address. A voice communication address may include, for example, PSTN telephone numbers, instant messaging handles, voice chat network addresses (e.g., IP addresses), e-mail addresses and the like.

By interfacing with PSTN gateway 105, IMS 101 may receive public switched telephone calls and digitize the calls, as needed, so that they may be directed to users of a digital voice service, voice mail server 117 or a user on a data network through communication gateway 103 and network 109. IMS 101 may register telephone numbers through PSTN gateway 105 such that calls to a number associated with a digital voice network user may be routed appropriately. Additionally, PSTN gateway 105 may provide IMS 101 with a way to access telephone network 107 so that calls originating from a communication device using digital voice services (e.g., phones 123) or other (e.g., Internet) data services (communication devices 121 such as personal computer (PC) 121a, laptop computer 121b, mobile communication device 121c and telecommunication devices 123a and 123b) may be properly directed to a user or device on telephone network 107.

Communication gateway 103 may provide IMS 101 with the capability to process voice chat, SMS, MMS or other data communications over network 109. For example, if a voice chat communication request is received from messaging service 119, communication gateway 103 may be configured to determine an intended recipient of the voice chat communications based on a specified voice communication address and instruct IMS 101 to process the voice chat communications appropriately. Messaging service 119 may include an instant messaging service having voice chat capabilities such as those provided by Yahoo, Google, AOL and Skype.

Further, according to one or more aspects of the disclosure, one or more of systems 101, 103, 115 and 117 may be configured to direct calls to multiple numbers or addresses of a contact in a predetermined or predefined order. That is, when a user initiates a call to a contact that has multiple numbers or address associated therewith, a communication management system such as IMS 101 may determine an order or implement a predefined order in which the numbers or addresses associated with the contact should be called or otherwise contacted. This order may be specified by the caller, for example. Accordingly, the order in which a contact's numbers are called may be different depending on the caller, the contact or other parameters. The order may be specified before a call or during a call depending on a system configuration and/or caller preferences. Alternatively or additionally, the order may be determined automatically based on a caller's calling history and/or a contact's call receiving history.

In one example, a contact's cell phone may be called first followed by his office number if there was no answer on the cell phone. Additionally or alternatively, calls may be placed simultaneously to multiple numbers such as to all or some of the numbers and/or addresses associated with a contact. A call connection may then be established between the caller and the contact at the number answered first. If none of the numbers are answered, the call may be directed to a voice-mail server such as server 117. In some arrangements, the order in which the contact's numbers are called may be caller-specified. Alternatively, the order may be automatically determined by IMS 101 based on the caller's call or communication history or the contact's call or communication receiving history, as further described herein. Moreover, in one or more configurations, a caller's device such as a cell phone 125a or stationary telephone 123a or 125b may be configured to perform the call establishment and forwarding functionality described herein.

Figure 2:
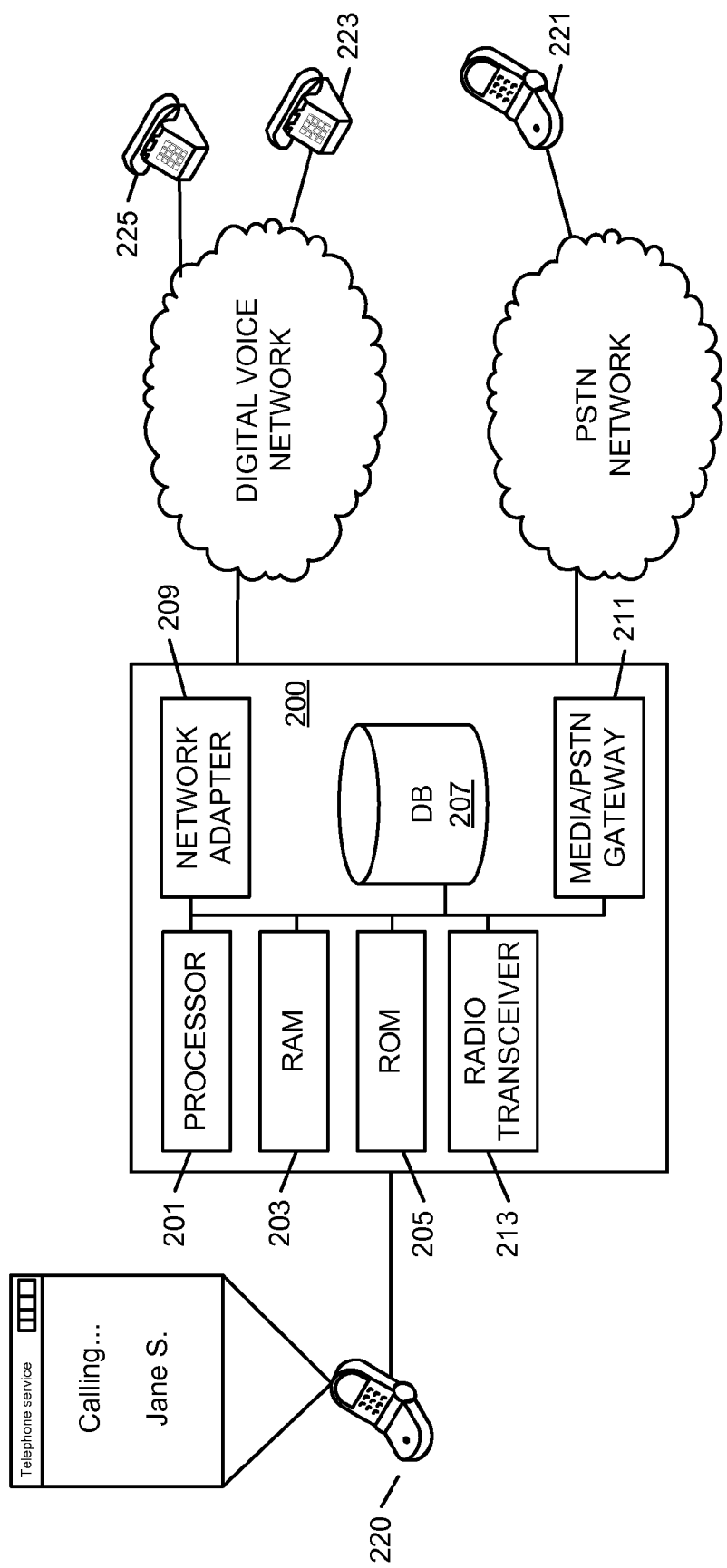
FIG. 2 illustrates a call management system configured to route calls according to a caller specified call order according to one or more aspects described herein.

FIG. 2 illustrates an example communication management system configured to establish communications between a party initiating the communication and a contact. The communication management system, in one embodiment, may include a call management system 200 configured to coordinate and establish telephonic communications between parties (e.g., a caller and a contact). System 200 may include a variety of components including a processor 201, random access memory (RAM) 203, read-only memory (ROM) 205, database 207, network adapter 209, media/PSTN gateway 211, radio transceiver 213 and the like. Call management system 200 may comprise or act as an IMS (e.g., IMS 101 of FIG. 1) or personal communication device such as cell phone 125a and/or stationary telephone 123a (FIG. 1). Processor 201 may be configured to perform a variety of mathematical calculations in conjunction with executing instructions stored in RAM 203 and/or ROM 205. Database 207 may be configured to store various types of data including contact names, contact numbers, and call direction/forwarding rules. Network adapter 209 may be used to connect and interface with one or more data networks such as the Internet through wired or wireless connections. Media/PSTN gateway 211, on the other hand, may be configured to establish plain old telephone service (POTS) calls and/or voice over Internet protocol (VOIP) calls. Alternatively or additionally, system 200 may include a radio transceiver 213 configured to facilitate connections with one or more wireless telecommunication networks including cellular networks.

In operation, call management system 200 may receive a request to call a contact from a caller's communication device 220. For example, the request may be a simple request from a cell phone to dial a number, or from a computer, etc. The request may specify the contact's name or other identification, and/or one of multiple numbers associated with the contact. Call management system 200 may then identify multiple numbers associated with the contact based on the contact's name and/or the number specified in the request. A caller-specified order in which to call the multiple numbers may subsequently be determined from database 207, for example. The order in which the multiple numbers are to be called may include a sequential and/or simultaneous calling of the contact's numbers. For example, contact's cell phone 221 may be called first, followed by office phone 223 if the call to cell phone 221 is not answered. If an answer is not received after the call to office phone 223, a further call may be made to home phone 225. Alternatively, the order may dictate that the contact's cell phone 221 and home phone 225 are to be called simultaneously, followed by office phone 223 if neither cell phone 221 nor home phone 225 is answered. With respect to the simultaneous calls to cell phone 221 and home phone 225, the first call or device that is answered may be the one to which the caller is connected. For example, upon requesting a call to the contact, the caller's communication device 220 may be placed on hold until an active connection (e.g., a live answered call) is established. The caller's communication device 220 may then be connected via the active call.

Database 207 may store a call order for a contact's phone numbers in association with a user. Thus, the order in which the numbers are called may be customized for different users (e.g., callers). In some arrangements, the order may be automatically determined by call management system 200 based on a caller's calling history or the contact's history of receiving calls at particular devices. Furthermore, the order may be automatically determined dynamically or on-the-fly. That is, the order may be determined at the time the call to the contact is initiated/requested. In other arrangements, the order may be determined by the caller, either previously or in real time.

A communication management system such as call management system 200 may further be configured to coordinate and facilitate the establishment of non-telephonic communications including e-mail messaging, short message service (SMS) or multimedia messaging service (MMS) messaging, instant messaging and the like. For example, call management system 200 may initially attempt to establish a call with a contact using a home phone number. If that call goes unanswered, the call management system 200 may subsequently try sending an SMS message to a mobile communication device of the contact using the mobile communication device number or address.

Figure 3:
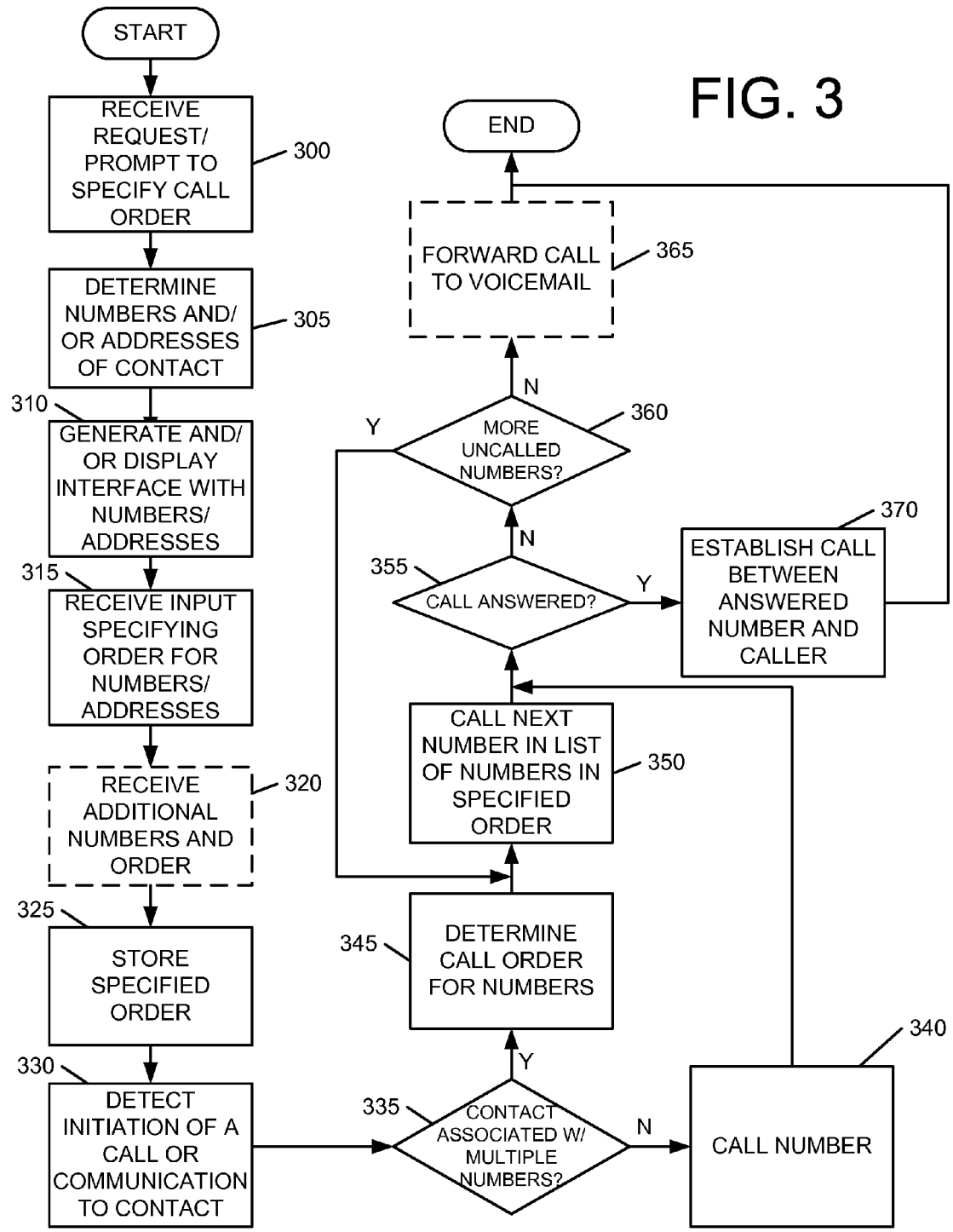
FIG. 3 illustrates a method by which a call order for multiple phone numbers of a contact may be defined by a caller and impelemented by a call management system according to one or more aspects described herein.

FIG. 3 illustrates an example method by which a call may be initiated based on a caller specified dialing order. In step 300, for example, a call management system may prompt a user or receive a request from the user to specify a call order for a particular caller contact. A user may make such a request through the calling device (e.g., cell phone, personal computer, television). In step 305, the call management system may determine a list of numbers corresponding to a particular contact. The list of numbers and/or addresses may include numbers for different locations and/or devices at which the contact may be reached. The numbers and/or addresses may be retrieved from, for example, the caller's address book or from a database. The caller's address book may be stored in a database at the call management system and/or in a caller's device. Alternatively or additionally, the list of numbers may be determined from a database of numbers stored by the call management system in association with a variety of known contacts. Alternatively, the call management system may be configured to search external databases and sources for numbers/addresses associated with the contact.

In step 310, the call management system may generate and/or display information comprising the list of numbers corresponding to the specified contact. The display may comprise a user interface, for example. The list of numbers and/or addresses may initially be displayed in a default or random order. In step 315, the call management system may receive user input specifying an order for the list of numbers and/or addresses (e.g., via user's drag-and-drop, assigning and/or weighing numbers, etc.). Optionally, in step 320, the call management system may further receive user input specifying additional numbers not included in the initial list and an order in which the additional number should be called. A user may specify that the numbers are to be called in a particular sequence or that some or all numbers (or addresses) may be contacted simultaneously. For example, numbers that are to be called simultaneously may be assigned the same sequence number (e.g., 1, 2, 3, 7, etc.). Once the caller has completed assigning the calling order, the call management system may store the specified order in step 325 for example by storing in a memory. In one or more arrangements, the order may be stored in a look-up table in association with the caller (e.g., a caller name, phone number, account number, etc.) and the contact (e.g., contact name, phone numbers, account number, etc.).

In step 330, the call management system may detect the initiation of a communication (e.g., a call) to a contact by a caller. Initiation of a call, for example, may include the user selecting a phone number and inputting a command into the caller's device to request that the call management system place a call to the specified contact. That is, a call might not be placed until the call management system transmits calling signals to the specified contact. Because calls from the caller's communication device may be managed by the call management system, the call management system may receive call initiation requests made by a user. In step 335, the call management system may determine if the specified contact is associated with multiple contact numbers. If not, the call management system may place a call to the single contact number in step 340. Placing the call may include sending signals through a network to a contact's device (e.g., causing a contact's device to ring or otherwise provide a call notification). If, however, the contact is associated with multiple numbers/addresses, the call management system may determine a caller specified order in which to call the multiple numbers/addresses in step 345. For example, the order may be retrieved or determined from a look-up table stored in a database using the caller's identity (e.g., a telephone number, Subscriber Identity Module (SIM) card number) and the contact's identity (e.g. telephone number, name, nickname) as search keys. Alternatively, the order may be retrieved from the caller's device or caller's database.

Upon determining the call order, the call management system may initiate a call to each of the numbers (or contact each address) in sequence. In step 350, for instance, the system may call the first number in the specified order. In step 355, the system may determine whether the call has been answered. If not, the system may end the first call and determine whether additional numbers have yet to be called in step 360. If additional numbers have yet to be called, the system may place a call to the next number in the order in step 350. If, on the other hand, no additional numbers are left in the calling order, the system may optionally establish a call between the caller and a voicemail server in step 365. If the system determines that call is answered in step 355, the system may connect the caller to the contact at the answered number in step 370.

As noted, in some instances, a call order may specify that two or more numbers are to be called simultaneously. In such arrangements, the system may place a call to each of the two or more numbers. The caller may then be connected to the number or address that is first answered while disconnecting or ending the calls to the other numbers. If none of the calls are answered, the system may proceed to determine if additional numbers have yet to be called as shown in step 360.

Figure 4:
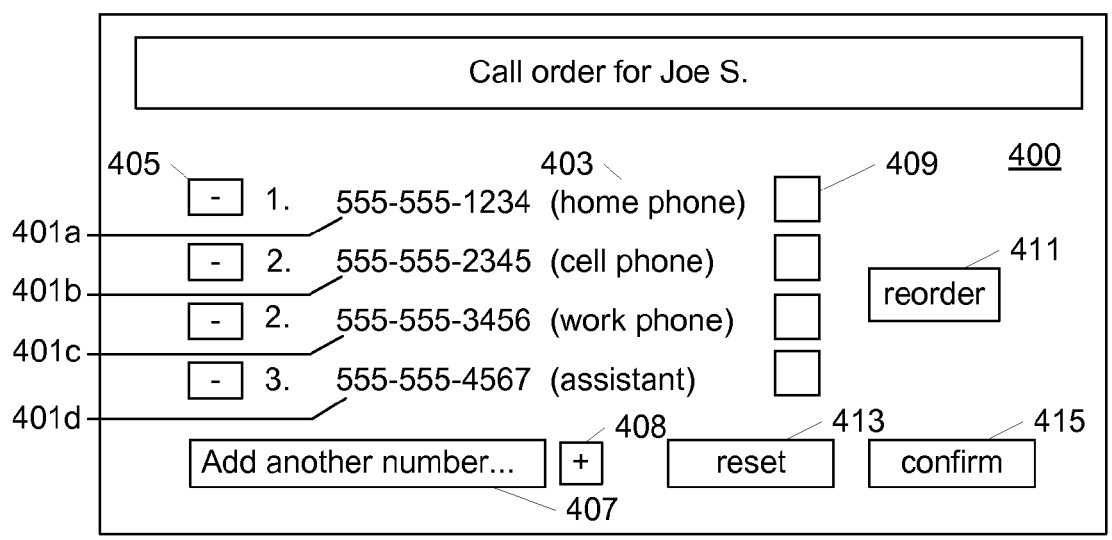
FIG. 4 illustrates an example user interface through which a call order may be defined.

FIG. 4 illustrates an example user interface through which a user may specify the order in which multiple numbers of a contact are to be called. Interface 400 may display a list of phone numbers 401 associated with a particular contact, Joe S. The list of phone numbers 401 may further include a description of the number 403. For example, the description for phone number 401 may indicate that number 401*a* is a home phone number while phone number 401*b* is Joe's cell phone number. If the user wishes to add another number for the contact, the user may enter the number in field 407 and select add function button 408. If the user wishes to delete a number, on the other hand, the user may select delete function button 405. The user may modify the order in which the numbers 401 are called by entering the order in fields 409. For example, if 555-555-3456 (e.g., number 401*c*) is to be called first, the number '1' may be entered into the corresponding field 409. Simultaneous calling may be indicated by specifying the same order number for the two phone numbers. For example, numbers 401*b* and 401*c* are set to be called simultaneously as indicated by the fact that both numbers 401*b* and 401*c* are second in the call order. Once a user has entered a desired order in field 409, the user may select reorder function 411 to update the order in the list. The user may further reset the order using option 413. The reset option 413 may return the list order to a default order or an immediately previous call order. Once the user completed modifications to the call order, the user may select the confirm option 415 to have the call order stored and entered into use.

According to one or more aspects, a user may define and store multiple orders of numbers for a single contact. For example, a normal call order may be defined for non-emergency calls and an emergency call order may be defined for more urgent calls. A user may select which order to use at the time of dialing/calling (e.g., an order based on time of day, such as morning or evening, or type of day, such as weekday or weekend, etc.) or upon being prompted by the call management system to select a particular call order. Alternatively or additionally, the user may be allowed to select between a caller defined order or a dynamically generated order (e.g., based on the user's calling history or the contact's call answering history). Still further, a user may override calling orders (e.g., to dial a single number) by specifying a dialing code or other key. For example, the user may dial *555 to disable automated dialing of multiple numbers. In another example, the call forwarding/automatic call order feature may be turned off by deselecting an option in a configuration screen (e.g., of a telephone service provider).

Figure 5:
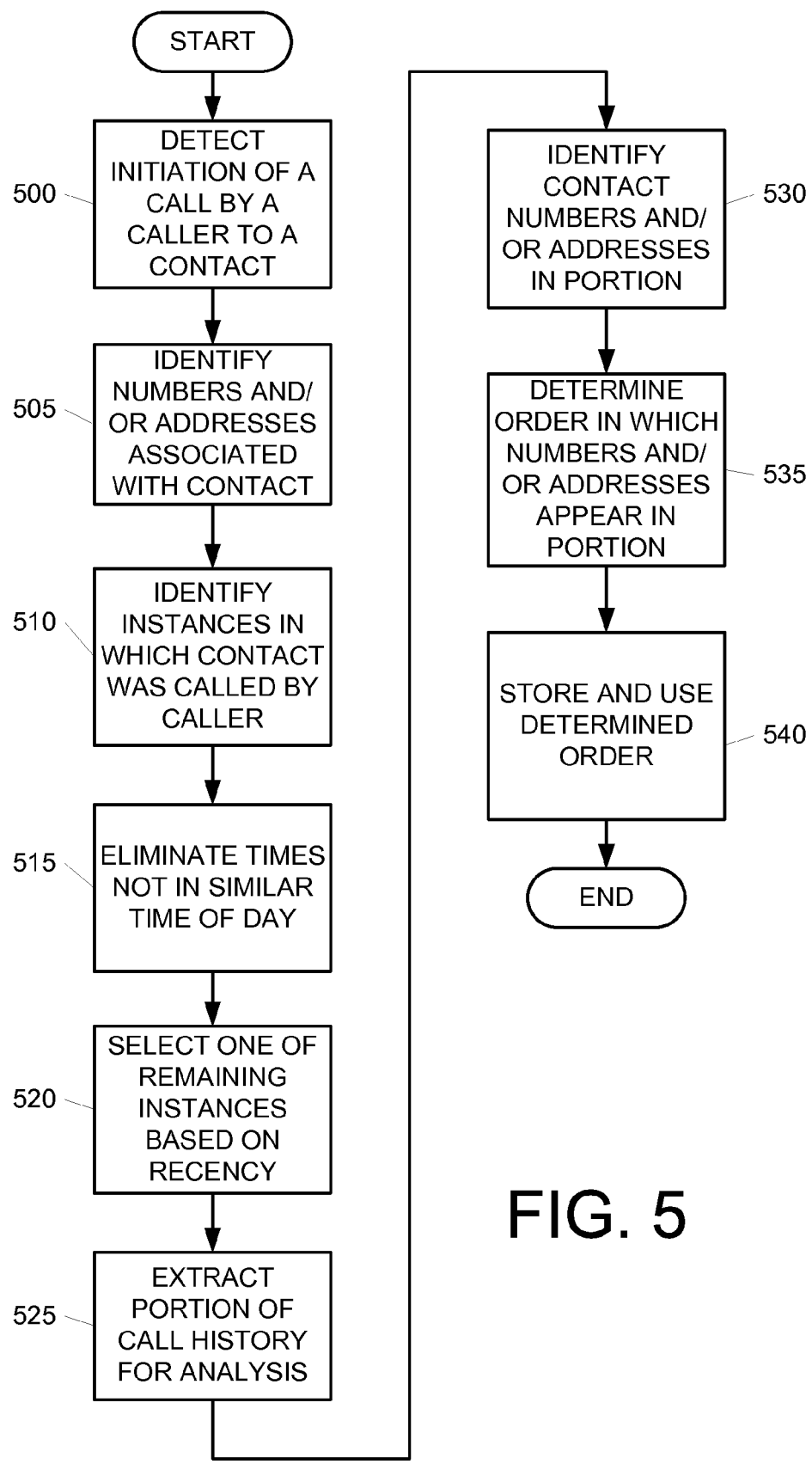
FIG. 5 illustrates a method by which a call order may be automatically defined according to one or more aspects described herein.

The order in which a contact's various phone numbers are called may be automatically and/or dynamically generated without manual user specification. For example, a user's call history may be consulted to determine the order in which the multiple numbers should be called. FIG. 5 illustrates an example method for dynamically and automatically generating a call order based on a prior order or how a set of numbers and/or addresses of a contact was previously used. In step 500, a call management system may detect the initiation of a call to a contact by a caller. For purposes of describing FIG. 5, it is assumed the contact is associated with a plurality of phone numbers. The call management system may make this determination using a process similar to step 335 of FIG. 3. In step 505, the call management system may identify the multiple numbers associated with the contact. Again, the numbers may be identified from the caller's address book or a directory or database internal or external to the call management system.

In step 510, the call management system may identify one or more times in the caller's call history at which the contact was called using the identified numbers. For example, a search may be performed on the caller's call history to identify all instances where one of the contact's numbers appears in the caller's call history. In step 515, the identified instances may be pared down by eliminating instances that do not fall within a similar time of day as a current time of day. For example, instances falling outside of 1 hour before or after the current time of day may be eliminated from the search results. Alternatively, in step 515, the system may eliminate instances that do not fall within a similar type of day, e.g., weekday or weekend. In step 520, the system may subsequently select one of the remaining identified instances to use to determine a call order. The selection may be made based on how recent a call was made. For example, the most recent identified instance may be selected. Alternatively or additionally, the call management system may select an instance based on how many of the contact's numbers appear within a predefined or predetermined time period of the instance (e.g., 30 seconds before and after each instance). The call instance corresponding to the time period in which the most numbers of the contact appear may then be identified and selected. If, however, multiple instances have the same number of matches, the most recent may be selected. Such instance selection is further described below with respect to FIG. 6. In other arrangements, multiple instances may be selected for analysis.

In step 525, a portion of the caller's call history may be extracted to determine the call order. The boundaries of the extracted portion may be defined by a predefined amount of time before and after a time corresponding to the selected instance such as 1 minute, 2 minutes, 30 seconds, 15 seconds, 10 seconds, 5 seconds and the like. For example, if the selected call instance was made at 1:05 PM, the extracted portion may include all calls between 1:04 PM-1:06 PM (e.g., given time boundaries of 1 minute before and after the time of the selected call instance). In step 530, each number of the contact present in the extracted portion of the call history may be identified. Duplicate contact numbers may be eliminated, leaving only the earliest instance of the contact number. Alternatively, the latest instance of the contact number may be preserved. Subsequently, in step 535, the order in which the identified contact numbers were called in the extracted portion of the call history may be determined. This order may be used as the order in which the numbers or addresses are to be called or contacted. In step 540, the order may be stored and used for directing the initiated call to the contact.

Alternatively or additionally, various other algorithms and methods for automatically defining a call order may be used. For example, duplicates might not be eliminated and instead, be used to define the call order. In one particular example, a number or address may be placed higher in the order of numbers or addresses the more frequently a number or address appears (as further described in FIG. 7). Such an arrangement may rely upon the assumption that a caller will use (what he or she considers) more reliable or desirable numbers or addresses more frequently. Frequency may also be used to more accurately match a caller's calling habits. In another example, a number or address may be placed lower in the order of numbers the more frequently the number or address appears (e.g., the frequency may be indicative of a number or address being frequently unanswered).

While the process of FIG. 5 is described as being dynamically performed upon detecting the initiation of a call, the call order may be automatically defined at other times as well, for example, prior to a call being made or upon a user selecting an automatic call routing feature. Alternatively or additionally, the call order may be automatically updated based on a predefined schedule or in an on-demand fashion. Moreover, the process of FIG. 5 is only an example and steps may be omitted or other steps added.

Figure 6:
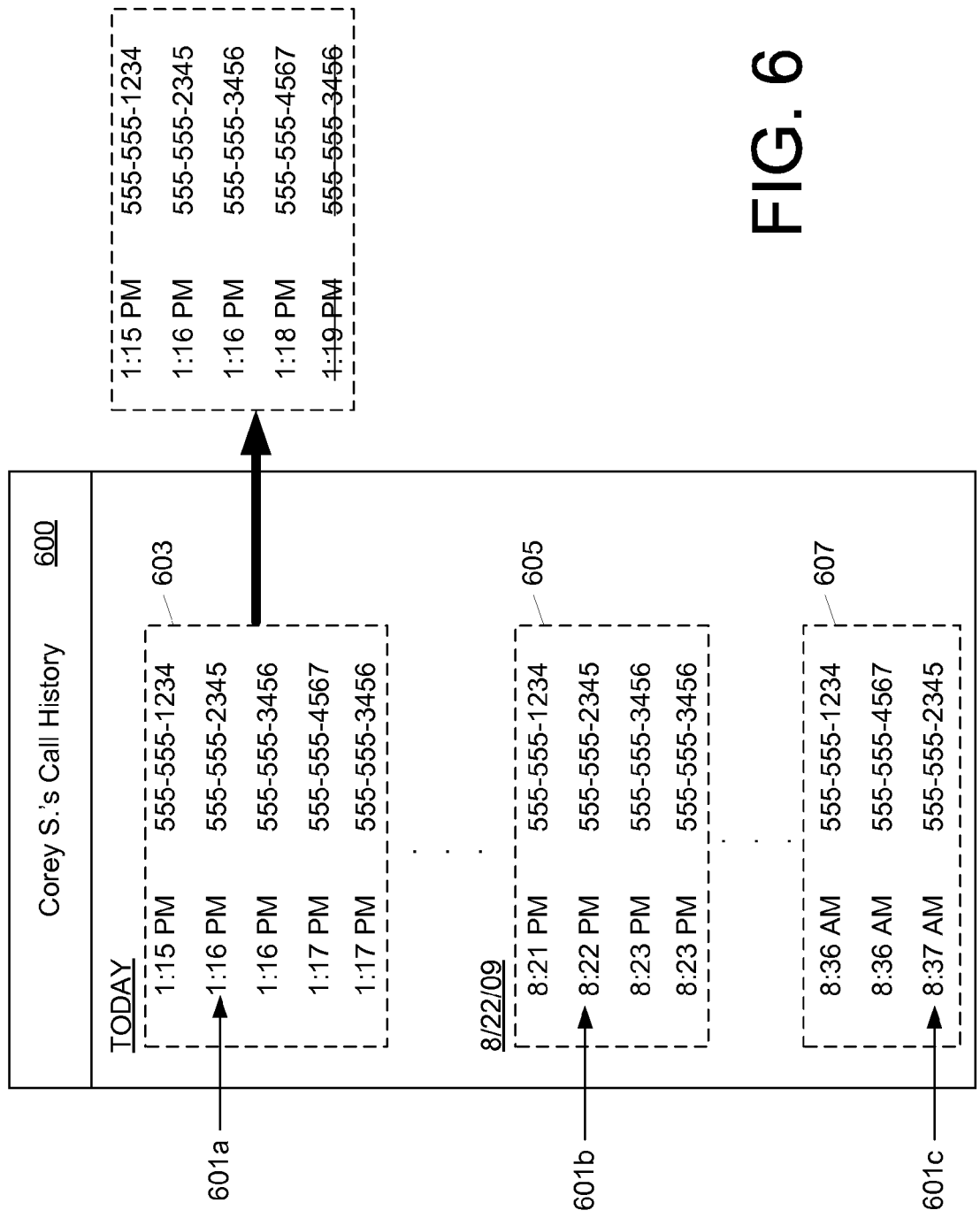
FIG. 6 illustrates selection of a call order analysis period from a user's call history according to one or more aspects described herein.

FIG. 6 illustrates selection of a call order analysis period from a caller's call history based on a list of numbers corresponding to a contact. User's call history 600 may include a list of calls made along with times those calls were made. Additionally, the calls may be organized according to date, from an earliest to a most recent call. As noted with respect to FIG. 5, instances 601 of a particular contact number such as 555-555-2345 may be identified from call history 600 in order to define a call order analysis period. Once instances 601 have been identified, a portion of the call history before and after each instance 601a, 601b and 601c may be analyzed to determine various characteristics, such as a number of contact numbers matched. The analyzed portions 603, 605 and 607 may be defined, for example, by retrieving all numbers dialed within a period between one minute before and after each of identified instances 601. Portions 603, 605 and 607, as illustrated, only display numbers of the contact. Other numbers (e.g., of users other than the contact) may, for example, be removed prior to call order analysis. Other time periods may be used to define portions 603, 605 and 607. For example, all numbers in a period between, for example, 3, 5, or 10 minutes before and after each of instances 601 may be retrieved and analyzed. In another example, all numbers called within a period beginning 2 minutes before and ending 5 minutes after each of instances 601a, 601b and 601c may be captured for review in portions 603, 605 and 607, respectively.

Based on the analysis of portions 603, 605 and 607, one or more of periods 603, 605 and 607 may be selected for automatically determining a call order for the user/caller-contact pair. For example, because portion 603 matches the most number of contact numbers and because portion 603 represents the most recent portion of the call history 600, period 603 may be used for determining the call order. In one or more arrangements, duplicate numbers may be eliminated so that each contact number only appears once in the analysis period. For example, because the number 555-555-3456 appears multiple times in period 603, the first instance of that number may be preserved while all others (e.g., the last identified contact number) is eliminated. According to one or more aspects, portion 603 may also be selected based on a similarity between a time of day at which a current call is being placed and the time of day associated with call history period 603.

Figure 7:
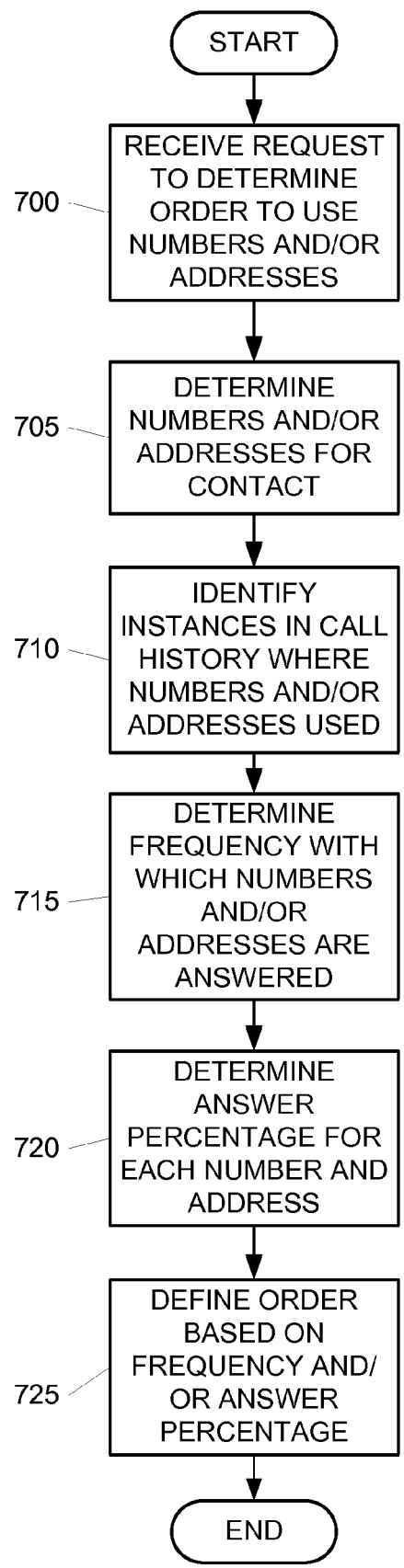
FIG. 7 is a flowchart illustrating a call order determination method according to one or more aspects described herein.

FIG. 7 illustrates another example method for dynamically and automatically generating an order in which to call or otherwise use a set of numbers and/or addresses of a contact based on a likelihood that a call will be answered. In step 700, a system such as a call management system 200 of FIG. 2 may receive a request to determine an order in which to call a set of numbers and/or addresses associated with a contact. The request may be automatically generated upon a caller initiating a call, for example. In response to the request, the system may determine one or more numbers and/or addresses corresponding to the contact in step 705. In step 710, the system may analyze a call history of the caller to identify instances in which the caller used one (or each) of the numbers and/or addresses of the contact. In some arrangements, the system might only analyze a portion of the call history. For example, the portion of the call history may include the most recent week of calls, most recent two weeks of calls or other recent time period, a similar time of day, day of week or type of day and the like.

In step 715, the system may subsequently determine a frequency with which each of the identified numbers and/or address of the contact was answered in the call history. Additionally or alternatively, a call history (or portion thereof) for each of the numbers and/or address of the contact may also be analyzed. For example, the system may determine how frequently calls to each number and/or address is answered regardless of caller based on the call history of the number or address. This information may be used in place of or in addition to the caller's calling history. Optionally, in step 720, the system may further determine a percentage of calls to each number and/or address that was answered. For example, if 10 calls were made to number or address X in the call history or portion of the call history, but only 2 were answered, the answer percentage may be 20%. Again, the call history of the contact's number or address may be used as well to determine the answer percentage. In step 725, the system may define the order in which to use the numbers and/or addresses of the contact based on the frequency and/or percentage of calls answered at each number and/or address. For example, the order may be defined based on a decreasing answer percentage, where the number or address with the highest answer percentage is placed first in the call order and the number or address with the lowest answer percentage is placed last in the call order. In another example, the order may be defined based on an absolute number of times the number or address was answered.

In some arrangements, a hybrid call order determination system and method may be used. For example, a user may specify that a particular number is to be called first and allow a call determination system (such as system 200 of FIG. 2) to determine an order of a remaining list of contact numbers. In another example, a caller may specify that a number should always be called as a last resort. In such instances, the caller may then allow the call determination system to specify the order in which the other numbers are to be dialed prior to the last resort number. Other configurations may also be used including allowing a user to define an order of 1, 2 or 3 numbers of a list of 5 numbers (e.g., using only a subset of available numbers/addresses) for a particular contact. In yet other arrangements, call orders may be a hybrid of caller determined, system determined and/or contact determined. For example, a user may be allowed to specify an order in which 2 of 5 numbers of a contact are dialed while the remaining 3 are dialed in an order specified by the contact. In this example, a contact specified order may be invoked if the caller has not specified an order for those numbers.

Figure 8:
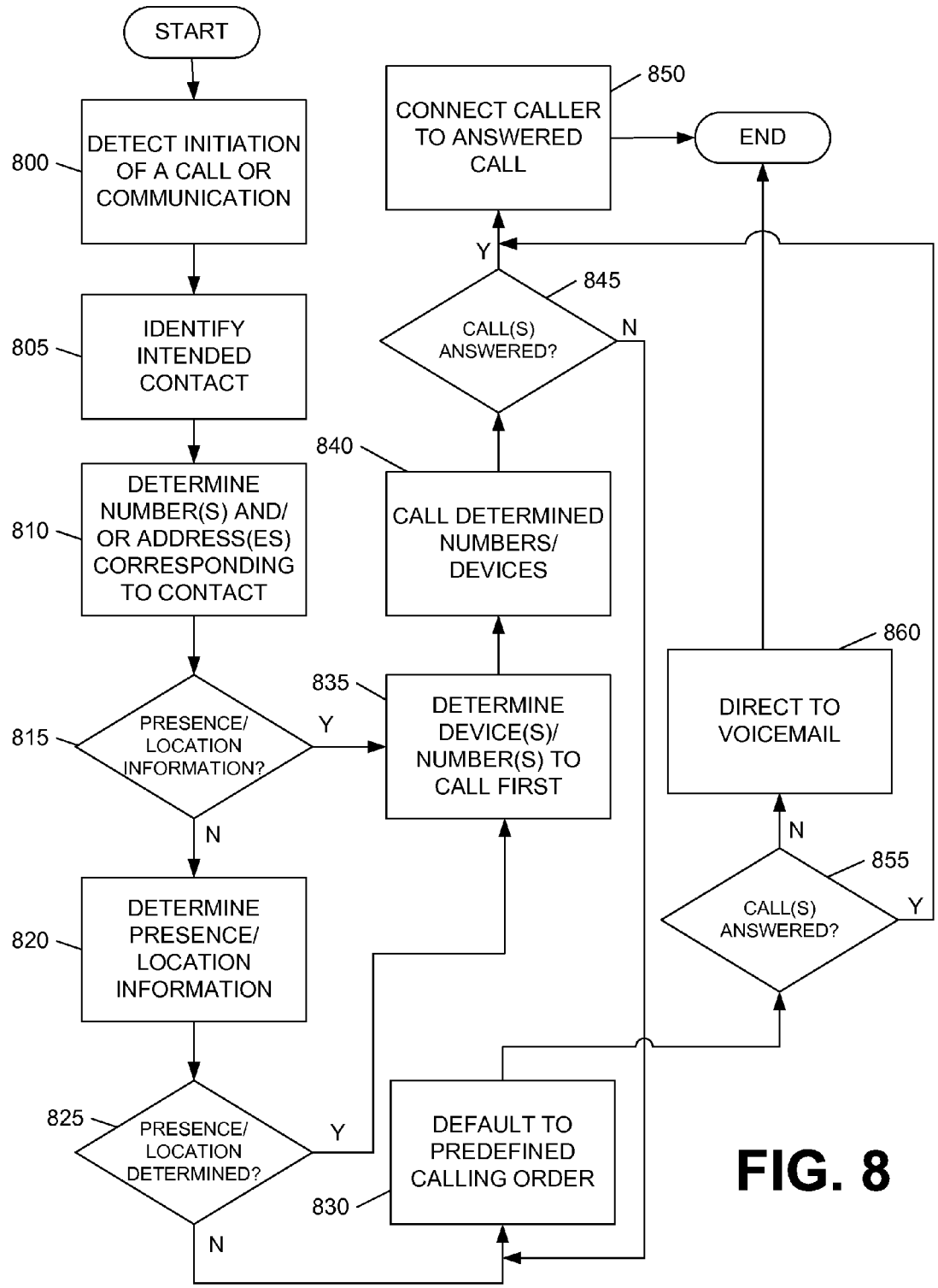
FIG. 8 is a flowchart illustrating a call order determination method according to one or more aspects described herein.

According to one or more arrangements, a contact's presence or location may be detected and known to a call management system, such as a softswitch or IMS core. Accordingly, a call order may be established using presence or location information, e.g., by taking into account or prioritizing a number associated with the user's presence or location ahead of other numbers. FIG. 8 illustrates a method by which a call order may be established using such information. In step 800, for example, a call management system may detect the initiation of a call. In step 805, the call management system may identify a contact associated with the call. Once the contact has been identified, the call management system may subsequently determine one or more numbers corresponding to the contact in step 810. Furthermore, the call management system may determine whether presence or location information is available in step 815. In some arrangements, for example, a present indicator may be stored in association with a number of a contact. If the presence or location information is not available, the call management system may attempt to determine such information in step 820.

Presence or location information may be known to or determined by the call management system in a variety of ways. For example, a call management system may request position information from a contact's device such as a cellular phone. The cellular phone may include position tracking systems such as a global position system (GPS) and/or triangulation positioning capabilities. In another example, a call management system may determine a position or presence of a contact based on a calling device used to make a most recent call (e.g., by inspecting a call history) or a device used to access another service (e.g., Internet) provided by a service provider corresponding to the call management system. In some arrangements, a presence indicator may be stored in association with one or more of the determined numbers. If presence or location information is still not available, as determined in step 825, the call management system may default to a specified calling order for the determined one or more numbers in step 830 or to an order selected by the user, for example. The calling system may then determine whether any of the calls are answered in step 855 and if not, direct the caller to voicemail in step 860. If, however, one or more numbers were answered by a live individual (e.g., the contact), the caller may be connected to the answered call in step 850.

If the contact's presence or location information is available or is determined, the call management system may subsequently determine one or more calling devices and/or numbers to call first based on the determined location in step 835. For example, if a callee's office number is associated with a presence/location tag, the call management system may identify the office number as an initially targeted number. Alternatively, the presence/location information may be only a factor in the order determination methods described herein. In another example, if a contact's location corresponds to the contact's home (e.g., a zipcode or latitude/longitude generally matches the contact's home zipcode or latitude/longitude), the contact's home phone number may be targeted. In still another example, a contact's mobile phone may be targeted if the contact's location does not correspond to a known location or does not correspond to a location having a known number for the contact. In step 840, the call management system may call the determined devices/numbers sequentially or simultaneously. In step 845, the call management system may determine whether any of the determined devices or numbers was answered by the contactor a live individual. If not, the call management system may proceed to call one or more other numbers based on a default calling order as shown in step 830. If one or more of the determined numbers initially called was answered by the contactor another live individual, the call management system may connect the caller to the answered call in step 850. Optionally, a presence tag may be stored in association with a calling device or number that is answered by the contact.

The aspects described herein may also be applied in similar fashion to communication (e.g., transmission/reception) of electronic data such as electronic mail (e-mail), text messages such as short messaging service (SMS) messages, multimedia messages such as multimedia messaging service (MMS) messages, instant messages (e.g., AOL Instance Messenger, GoogleTalk, etc.). For example, a user may have an instant messaging account, an SMS address or number, and a phone number. An order determination system may define an order in which to use or contact each of these numbers and addresses. For example, a system may initiate communication with a contact using an instant messaging address (e.g., a handle or e-mail address) by transmitting a chat request to the contact at the instant messaging address. An SMS message or other electronic data message may be considered unanswered if no response is received within a predefined amount of time. Alternatively or additionally, a message may be unanswered if an automated reply indicating that the message was not delivered or that the contact is unavailable is received. An order in which the data messaging addresses and/or numbers is defined based on the methodologies and systems described herein. For example, the order may be defined based on a user's previous order of data transmissions or calls and/or based on a frequency of answers/responses. Alternatively or additionally, a user may manually define the order. Hybrid orders might also be applied. Still further, the order may be defined by the contact.

Figure 9:
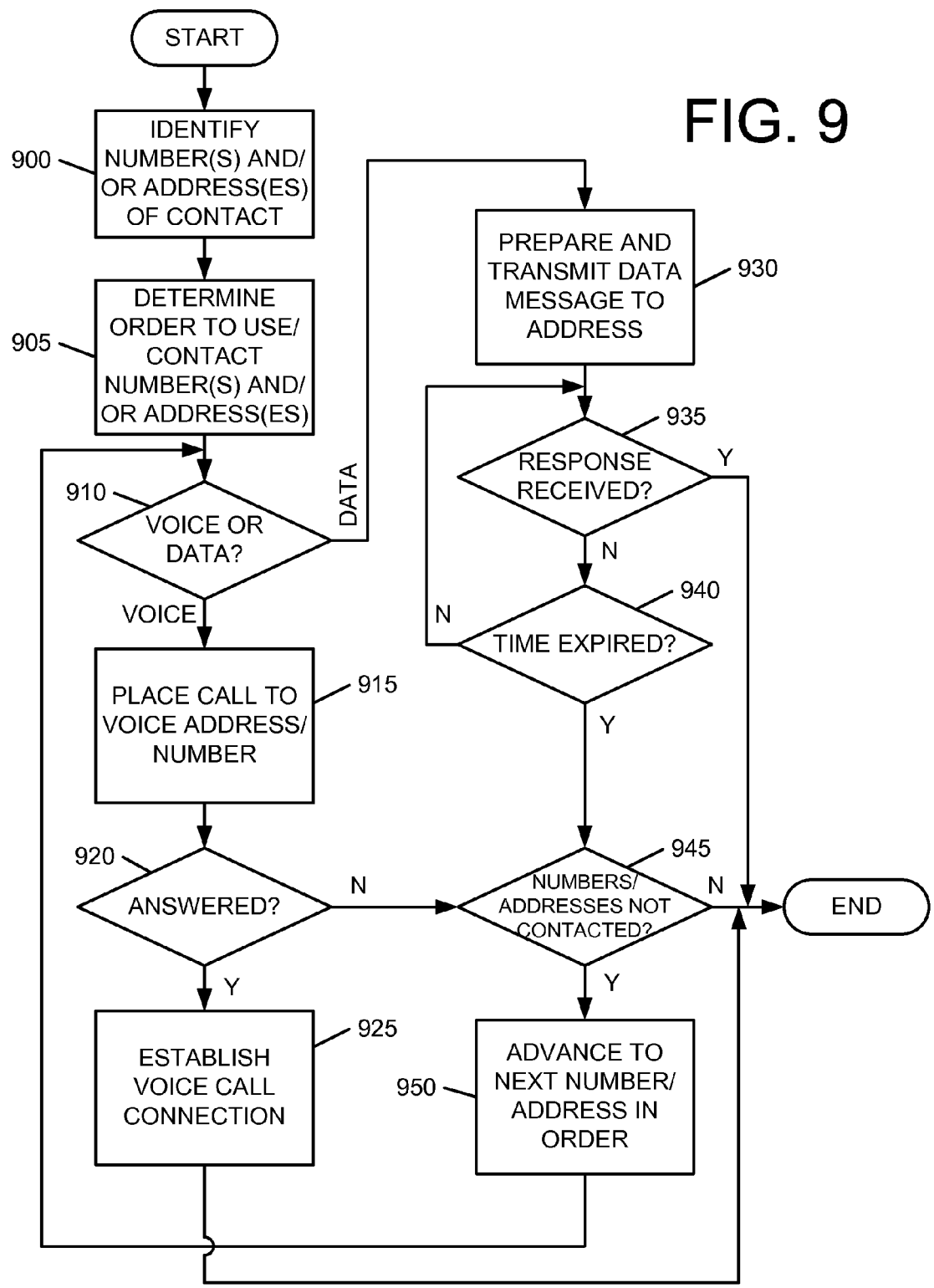
FIG. 9 is a flowchart illustrating a method by which a call or data transmission may be initiated and processed according to one or more aspects described herein.

FIG. 9 illustrates an example method by which a messaging management system may automatically initiate communications with a contact using multiple data messaging addresses and numbers. Using a number or address may include calling a contact at a voice number, generating and/or sending a chat request to a contact based on an instant messaging address, transmitting an SMS or MMS to a contact at a number or address, generating and/or transmitting an e-mail to another party via an e-mail address and the like. In step 900, the management system may identify a set of data messaging and/or voice communication addresses and numbers associated with a contact with which a user wishes to initiate communications. An initiating party or initiator of a communication may be an individual initiating communication to another person or device, a person requesting transmission of an electronic message to another individual or device and the like. Addresses and numbers may be retrieved from a user database, a service provider database and the like. In step 905, the management system may determine an order in which to use each of the addresses and numbers. For example, the order may be defined according to the methods and aspects described herein. In step 910, the management system may determine whether a first address or number to use corresponds to a voice address or a data messaging address. If voice, the management system may initiate communication with the contact using the first address. For example, the system may place a call to the voice address as described in step 915. The system may further determine whether the communication (e.g., the call) was answered in step 920. In some arrangements, a call may be considered answered only if a live person picks up the call. Alternatively, a call might also be considered answered if an automated voice system picks up the call. If so, the management system may establish a connection between the caller and the contact in step 925 and the process may then end without contacting the other numbers and/or addresses.

If, however, the first address or number corresponds to a data messaging address, the management system may initiate communication with the contact using the data messaging address by, for example, preparing and transmitting a data message to the address in step 930. The message may be user generated, system generated or a combination of both. In one example, the message may include "Hi, I'm trying to contact you. Please let me know if you are there." In step 935, the management system may determine whether a response to the communication has been received. The system may monitor for a response for a predefined amount of time (e.g., 30 seconds, 1 minute, 5 minutes, 15 minutes, 1 hour, etc.). If no response is received, the management system may determine whether the predefined amount of monitoring time has expired in step 940. If so, the system may proceed to step 945 as described below. In conjunction with moving on to the next number or address, in some arrangements, the system may send a follow-up message to the previous address indicating that the caller will try another number or address. For example, the message may include "I haven't received a response yet. I'll try you at a different number or address." If an answer is received within the allotted monitoring time, the management system may end the process without contacting the other numbers and/or addresses.

If however, either a call or a data message is not answered, the call management system may determine whether more addresses or numbers have not been used in step 945. If so, the system may proceed to trying a subsequent number or address in the specified order in step 950 and return to step 910. Otherwise, the process may end. The party initiating the communication with the contact may also be notified that all numbers and addresses were tried but not answered. In this and other methods described herein, steps may be omitted or added, as desired.

Figure 10:
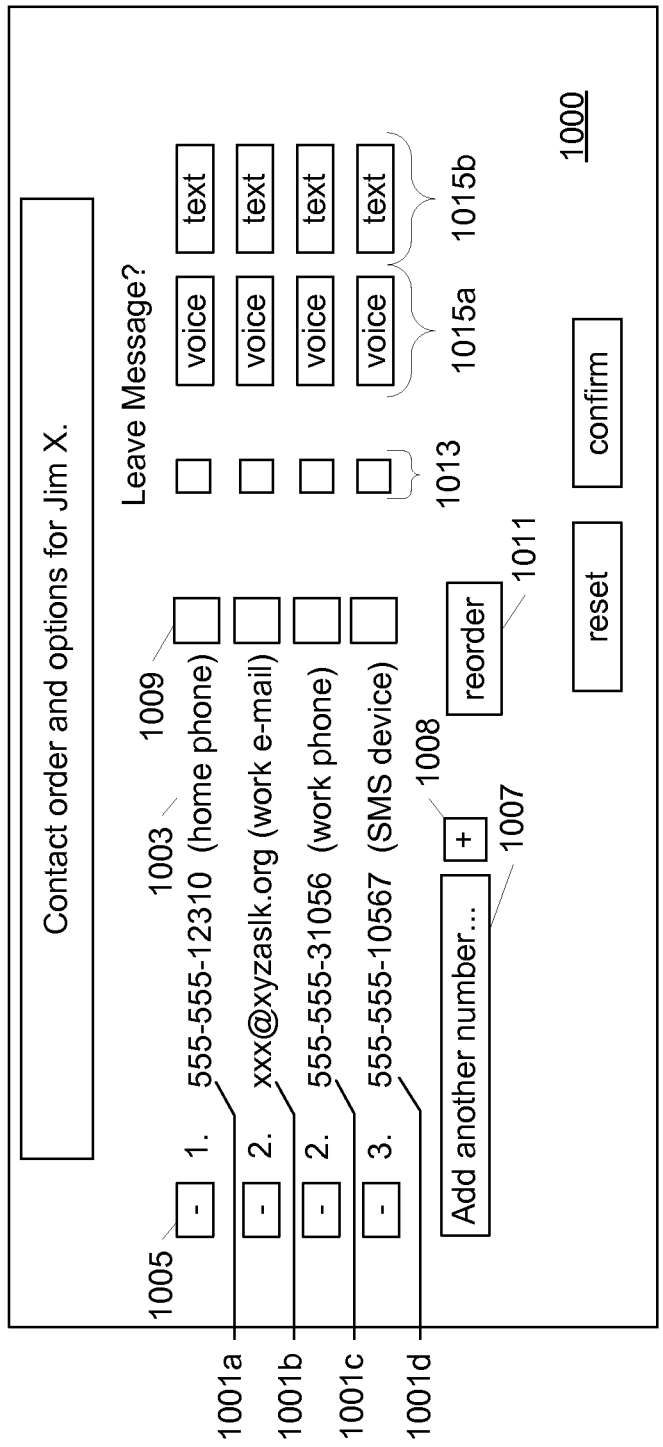
FIG. 10 illustrates an example user interface through which a contact order may be defined according to one or more aspects described herein.

FIG. 10 illustrates an example order configuration interface for defining an order in which numbers and addresses for a contact are used to initiate communication (e.g., called, e-mailed, instant messaged, sent an SMS or MMS message, etc.). Interface 1000 may display a list of phone numbers and addresses 1001 associated with a particular contact, Jim X. The list of phone numbers and addresses 1001 may further include a description of the number 1003. For example, the description for phone number 1001 may indicate that number 1001 a is a home phone number while address 1001b is Jim's work e-mail address. If the user wishes to add another number or address for the contact, the user may enter the number or address in field 1007 and select add function button 1008. The user may modify the order in which the numbers and addresses 1001 are contacted by entering the order in fields 1009. Simultaneously calling may be indicated by specifying the same order number for the two phone numbers. Once a user has entered a desired order in fields 1009, the user may select reorder function 1011 to update the order in the list.

Additionally or alternatively, for either voice addresses or data addresses, interface 1000 may allow a user to indicate whether a message should be left at the address if it is not answered (e.g., by a live individual) using option 1013. Additionally, interface 1000 includes options 1015a and 1015b for recording an audio or text message, respectively, to be delivered if a message is to be left.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more of the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

Although specific examples of carrying out various features have been described, those skilled in the art will appreciate that there are numerous variations and permutations of the above-described systems and methods that are contained within the spirit and scope of the disclosure as set forth in the appended claims. Additionally, numerous other embodiments, modifications and variations within the scope and spirit of the appended claims will occur to persons of ordinary skill in the art from a review of this disclosure.

We claim:

1. A method, implemented by one or more computing devices, comprising:

receiving a request from a first user to initiate a communication session between the first user and a contact, wherein the contact is associated with a plurality of communication addresses;

identifying, in a communication history of the first user, a plurality of instances when the first user initiated communication with the contact by using at least a first communication address;

selecting a first instance, of the plurality of instances, when the first user initiated communication with the contact, wherein the selecting is based at least in part on a first characteristic, and wherein the first characteristic comprises a similarity between a time of day associated with the first instance and a time of day of the requested communication session;

determining a first portion of the communication history, wherein the first portion of the communication history is defined by a first predefined time period before a time corresponding to the selected first instance and a second predefined time period after the time corresponding to the selected first instance;

determining one or more additional instances, within the first portion of the communication history, when the first user initiated communication with the contact;

using the first portion of the communication history to determine an order in which the plurality of communication addresses associated with the contact should be used to initiate the requested communication session; and attempting to initiate the requested communication session by using one or more of the plurality of communication addresses in the determined order.

2. The method of claim 1, wherein the selecting the first instance when the first user initiated communication with the contact further comprises:
  determining a time of day associated with the requested communication session, the determined time of day comprising a first boundary and a second boundary, wherein the first boundary is defined by a first predetermined time period prior to the determined time of day, and wherein the second boundary is defined by a second predetermined time period after the determined time of day; and
  for each identified instance of the plurality of instances:
  eliminating the identified instance from the plurality of instances where a time of day corresponding to the identified instance does not fall within the first boundary and the second boundary.

3. The method of claim 1, wherein the using the first instance and the one or more additional instances to determine the order further comprises:
  determining a sequence, within the first portion of the communication history, in which the plurality of communication addresses were used by the first user to initiate communication with the contact.

4. The method of claim 1, wherein the determined order is different from a second order in which the plurality of communication addresses are used to attempt to initiate communication with the contact for a second user.

5. The method of claim 4, further comprising:
  determining a first portion of a communication history of the second user, wherein the first portion of the communication history of the second user comprises one or more instances in which the second user previously attempted to initiate communication with the contact; and
  using the one or more instances to determine the second order.

6. The method of claim 1, wherein the attempting to initiate the requested communication session further comprises:
  simultaneously using the first communication address and a second communication address of the plurality of communication addresses to initiate the requested communication session with the contact.

7. The method of claim 1, further comprising:
  prioritizing the determined order based on a location of the first user.

8. The method of claim 1, wherein the first characteristic further comprises a number of communications addresses identified within a predetermined time period of the first instance.

9. The method of claim 1, wherein the using the first instance and the one or more additional instances to determine the order further comprises:
  deprioritizing one or more communication addresses in the determined order based at least in part upon a frequency of unsuccessful attempts to initiate communication with the contact using the plurality of communication addresses.

10. The method of claim 1, wherein the first characteristic further comprises a recency of the first instance.

11. The method of claim 1, further comprising:
  prioritizing the determined order based on a location of the contact.

12. The method of claim 1, wherein each instance, of the plurality of instances, indicates a communication address associated with the contact appearing in the communication history of the first user.

13. The method of claim 1, wherein using the first portion of the communication history to determine the order further comprises:
  using the first instance and the one or more additional instances to determine the order in which the plurality of communication addresses associated with the contact should be used to initiate the requested communication session.

14. One or more non-transitory computer readable media storing instructions that, when executed by at least one processor, cause the at least one processor to:
  receive a request from a first user to initiate a communication session between the first user and a contact, wherein the contact is associated with a plurality of communication addresses;
  identify, in a communication history of the first user, a plurality of instances when the first user initiated communication with the contact by using at least a first communication address;
  select a first instance, of the plurality of instances, when the first user initiated communication with the contact, wherein the selecting is based at least in part on a first characteristic, and wherein the first characteristic comprises a similarity between a time of day associated with the first instance and a time of day of the requested communication session;
  determine a first portion of the communication history, wherein the first portion of the communication history is defined by a first predefined time period before a time corresponding to the selected first instance and a second predefined time period after the time corresponding to the selected first instance;
  determine one or more additional instances, within the first portion of the communication history, when the first user initiated communication with the contact;
  using the first portion of the communication history to determine an order in which the plurality of communication addresses associated with the contact should be used to initiate the requested communication session; and
  attempt to initiate the requested communication session by using one or more of the plurality of communication addresses in the determined order.

15. The one or more non-transitory computer readable media of claim 14, wherein the first characteristic further comprises a number of communications addresses identified within a predetermined time period of the first instance.

16. The one or more non-transitory computer readable media of claim 14, wherein the determined order is different from a second order in which the plurality of communication addresses are used to attempt to initiate communication with the contact for a second user.

17. The one or more non-transitory computer readable media of claim 16, wherein the instructions, when executed, further cause the at least one processor to:
  determine a first portion of a communication history of the second user, wherein the first portion of the communication history of the second user comprises one or more instances in which the second user previously attempted to initiate communication with the contact; and
  use the one or more instances to determine the second order.

18. A call management system comprising:
  a processor; and
  memory storing instructions that, when executed by the processor, cause the call management system to:

receive a request from a first user to initiate a communication session between the first user and a contact, wherein the contact is associated with a plurality of communication addresses;

identify, in a communication history of the first user, a plurality of instances when the first user initiated communication with the contact by using at least a first communication address;

select a first instance, of the plurality of instances, when the first user initiated communication with the contact, wherein the selecting is based at least in part on a first characteristic, and wherein the first characteristic comprises a similarity between a time of day associated with the first instance and a time of day of the requested communication session;

determine a first portion of the communication history, wherein the first portion of the communication history is defined by a first predefined time period before a time corresponding to the selected first instance and a second predefined time period after the time corresponding to the selected first instance;

determine one or more additional instances, within the first portion of the communication history, when the first user initiated communication with the contact;

use the first portion of the communication history to determine an order in which the plurality of communication addresses associated with the contact should be used to initiate the requested communication session; and attempt to initiate the requested communication session by using one or more of the plurality of communication addresses in the determined order.

19. The call management system of claim 18, wherein the instructions, when executed by the processor, cause the call management system to use the first instance and the one or more additional instances to determine the order by:

determining a sequence, within the first portion of the communication history, in which the plurality of communication addresses were used by the first user to initiate communication with the contact.

20. The call management system of claim 18, wherein each instance, of the plurality of instances, indicates a communication address associated with the contact appearing in the communication history of the first user.

* * * * *

UNITED STATES PATENT AND TRADEMARK OFFICE
CERTIFICATE OF CORRECTION

PATENT NO. : 9,553,983 B2  Page 1 of 1
APPLICATION NO. : 12/897994
DATED : January 24, 2017
INVENTOR(S) : Athias et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1187 days.

Signed and Sealed this
Twenty-fifth Day of September, 2018

Andrei Iancu
*Director of the United States Patent and Trademark Office*